No. 764,967. PATENTED JULY 12, 1904.
T. W. & H. L. WARNER.
TILTING STEERING WHEEL.
APPLICATION FILED DEC. 31, 1903.
NO MODEL.
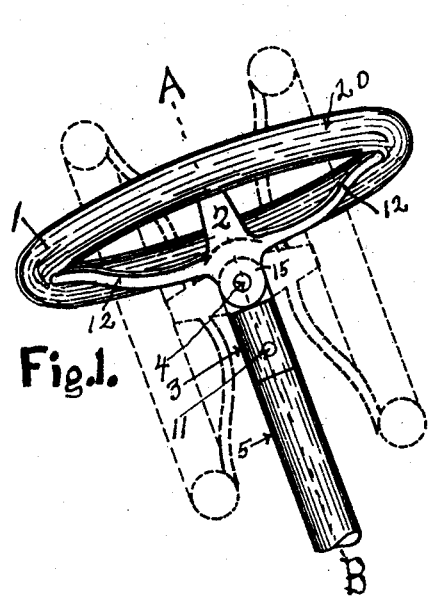
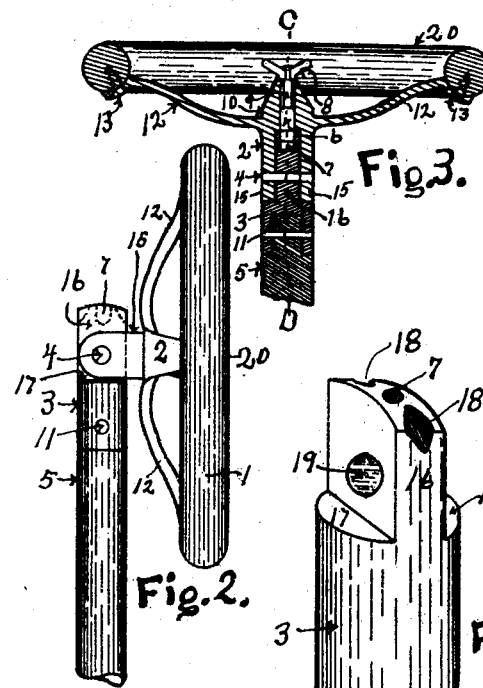
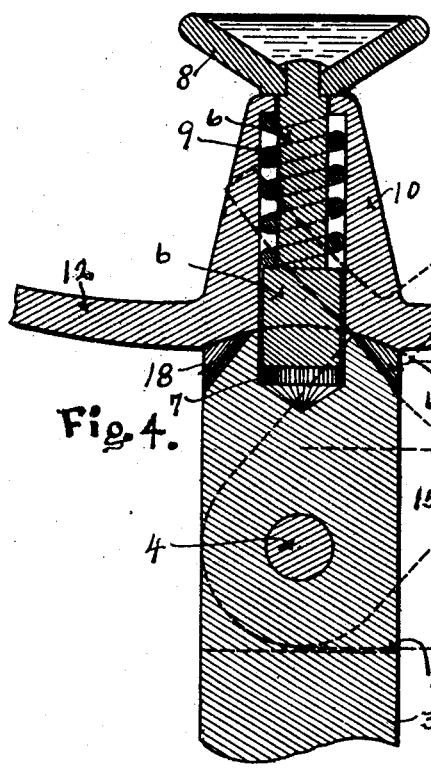
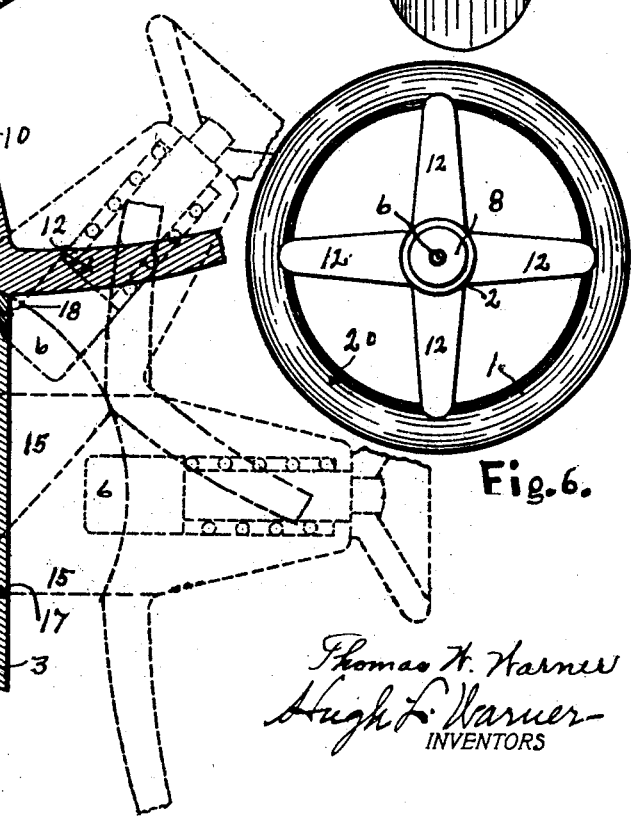
WITNESSES:
Harriette Johnson
Stella Tegarden
Thomas W. Warner
Hugh L. Warner
INVENTORS No. 764,967.

Patented July 12, 1904.

UNITED STATES PATENT OFFICE.

THOMAS W. WARNER AND HUGH L. WARNER, OF MUNCIE, INDIANA, ASSIGNORS TO WARNER GEAR COMPANY, OF MUNCIE, INDIANA.

TILTING STEERING-WHEEL.

SPECIFICATION forming part of Letters Patent No. 764,967, dated July 12, 1904.

Application filed December 31, 1903. Serial No. 187,373. (No model.)

*To all whom it may concern:*

Be it known that we, THOMAS W. WARNER and HUGH L. WARNER, both of Muncie, in the county of Delaware and State of Indiana, have invented a new and useful Tilting Steering-Wheel, of which the following is a specification.

Our invention relates to improvements in steering-wheels, and particularly to the kind used on automobiles, with which the driver of such vehicle controls the direction of his machine.

The objects of our invention are, first, to lower the cost of automobile construction by producing a steering-wheel at a low cost, and, second, to produce a steering-wheel that can be tilted two ways, either forward and backward or to right and left, (owing to the position in which the automobile stops,) so as to allow the driver more room to get into and out of his seat.

Our invention is in the construction and arrangement of parts to accomplish the above results, as illustrated in the accompanying drawings, in which—

Figure 1 is a side view of our steering-wheel complete mounted on a steering-post, the dotted lines showing the two ways it can be tilted. Fig. 2 is the same view showing the wheel proper tilted as far to the right as as it is possible to do. Fig. 3 is a sectional view taken on a line A B in Fig. 1. Fig. 4 is an enlarged sectional view taken on a line C D in Fig. 3, the rim and a part of the arms broken away. Fig. 5 is a perspective view of the base-piece or supporting member. Fig. 6 is a plan view of our wheel proper, showing the arrangement of the arms, the hub, and the locking device.

The wheel proper consists of a central hub portion 10, having arms 12 12 extending outwardly and supporting a rim 20, which is secured to the arms 12 12 by the screws 13 13. The hub and the arms form the spider portion of the wheel proper. A portion of the material extends downward below the hub proper and forms two ears 15 15, which straddle closely the flat portion of the peculiar-shaped supporting member 3 and is pivotally mounted thereon by the pin 4.

The support 3 is made detachable from the wheel 2 by pin 4, which pivots in opening 19, so as to admit the support 3 being easily chucked in a lathe and bored out, turned down, or otherwise fitted to the usual steering-post 5, to which we show it secured by the pin 11.

When our wheel is to be used to steer with, it must stand in axial alinement with the supporting member 3, as shown in Figs. 1, 3, and 4, and is held rigidly in this position by the plunger 6, which fits snugly into the opening 7 in the top end of the supporting member 3 and is held in place by the spring 9. The plunger 6 is provided with a flange-top 8, by which the operator can pull the plunger up and disengage it from the socket 7 when it is desired to tilt the wheel out of the driver's way.

Many times the driver of such vehicle finds that his machine has stopped with the front wheel so close to a curb or in such a deep rut or where he cannot turn the steering-wheel so he is forced to either strain the steering mechanism in his effort to get the ordinary single-tilting steering-wheel where he can tilt it or to get released from his seat in a very clumsy way. With our improved double-tilting steering-wheel it can always be tilted away from the driver, either forward or to the right or left, owing to the exact position in which it stands when the vehicle stops.

The peculiar shape of the supporting member 3 is such that the plunger 19 automatically locks the steering-wheel 2 in steering position, as shown in Fig. 1 in solid lines, for when the wheel 2, tilted as shown by dotted lines in Fig. 4, is straightened up into steering position (shown in solid lines) the plunger 6 is shoved back or up into the hub proper by its sliding contact with the inclined notches or surfaces 18 18 on the support 3. Fig. 4 shows in dotted lines the plunger 6, mounting one of the inclined surfaces 18 as the steering-wheel proper is being set in steering position. This construction allows the plunger to project farther out of the hub proper than any other way. Hence it is a very essential thing in order to a perfectly safe locking device, as the projecting end of the plunger 6 has very little if any taper, as the nearer straight the opening 7 is made and the closer fit the plunger 6 is into it the better service the locking device will give. When the steering-wheel is tilted to a right-angle position, as shown in Fig. 2 and in dotted lines in Fig. 4, the edges of the ears 15 15 make a positive stop against the shoulders 17 17 of the support 3, which prevents the rim 20 (usually made of wood) from striking against the steering-post 5. This is done for two reasons, first, so as not to mar the rim or post, and, second, so as not to loosen the screws 13 13.

We are aware that steering-wheels are old and many of them in use; but

What we have described in a vehicle steering-wheel as new, and desire to secure by Letters Patent, is—

1. In a tilting steering-wheel, the combination with a rim, of a spider attached to the rim, a supporting member engaging said spider, a pin projecting through said supporting member and engaging ears on said spider, a locking-pin substantially in axial alinement with said supporting member and adapted to engage with it.

2. In a tilting steering-wheel, the combination with a rim, of a spider attached to the rim, there being a hub projection on said spider, a plunger mounted in said hub, means for holding said plunger in engagement, ears projecting below said hub, a supporting member pivotally mounted between said ears.

3. In a tilting steering-wheel, the combination with a rim, of a spider substantially in the center thereof, and having a hub projection on said spider, a supporting member on which said spider is hinged, a locking device carried in said hub and adapted to engage the adjacent end of said supporting member.

4. In a tilting steering-wheel, the combination with a rim, of a spider having a thickened hub, a supporting member on which the spider is pivotally mounted, a plunger-bolt mounted substantially in center of said hub and adapted to engage a suitable opening in the said supporting member, a spring for actuating said bolt and a flange attached to the top end of said plunger-bolt.

In witness whereof we subscribe our signatures in the presence of two witnesses.

THOMAS W. WARNER.
HUGH L. WARNER.

Witnesses:
HARRIETTE JOHNSON,
STELLA LEGARDEN.